United States Patent
Justice et al.

[11] 3,734,631
[45] May 22, 1973

[54] NONDISPERSIVE INFRARED GAS ANALYZER EMPLOYING SOLID STATE EMITTERS AND PHOTODETECTORS

[75] Inventors: Gregory Justice, Mountain View; Egon E. Loebner, Palo Alto, both of Calif.

[73] Assignee: Hewlett-Packard Company, Palo Alto, Calif.

[22] Filed: May 28, 1971

[21] Appl. No.: 147,788

[52] U.S. Cl. ..........356/205, 250/43.5 R, 250/220 R, 356/51, 356/95
[51] Int. Cl. ......................G01n 21/22, G01n 21/34
[58] Field of Search ..................250/43.5 R, 220; 356/51, 74, 88, 93, 95, 205

[56] References Cited

UNITED STATES PATENTS

| | | |
|---|---|---|
| 3,588,253 | 6/1971 | Wittmann..............................356/93 |
| 3,413,482 | 11/1968 | Ling......................................356/51 |
| 3,435,209 | 3/1969 | Keahl....................................356/51 |
| 3,521,958 | 7/1970 | Treharne...............................356/93 |
| 3,174,037 | 3/1965 | Demorest et al. ......................356/51 |
| 3,457,412 | 7/1969 | Cary......................................356/51 |
| 2,703,844 | 3/1955 | Miller....................................356/51 |
| 3,005,097 | 10/1961 | Hummel..........................250/43.5 R |

FOREIGN PATENTS OR APPLICATIONS

1,186,957    4/1970    Great Britain..........................356/51

Primary Examiner—Ronald L. Wibert
Assistant Examiner—V. P. McGraw
Attorney—Roland I. Griffin

[57] ABSTRACT

A nondispersive infrared gas analyzer employing a pair of solid state radiation emitters and a pair of solid state photoconductors is arranged in an optoelectronic network comprising two branches, each branch including a separate optical radiation beam, both beams passing through the sample. The spectrum of one beam is such that the detected radiation from that beam is substantially independent of the concentration of the absorbent to be measured, the detected radiation of the other beam thereby being differentially modulated relative to that of the first beam by the absorbent under analysis. Means are provided including said photoconductors for converting the differential modulation into an output signal indication of the concentration of the absorbents. One embodiment employs a selective radiation source stage and another embodiment employs a selective detector stage. Control circuits are employed for regulating the relative radiation fluxes in the two branches of the networks. Additional control circuits are used for controlling the absolute amplitude of the fluxes in the two branches of the network.

16 Claims, 12 Drawing Figures

INVENTORS
EGON E. LOEBNER
GREGORY JUSTICE

INVENTORS
EGON E. LOEBNER
GREGORY JUSTICE

INVENTORS
EGON E. LOEBNER
GREGORY JUSTICE

INVENTORS
EGON E. LOEBNER
GREGORY JUSTICE

3,734,631

NONDISPERSIVE INFRARED GAS ANALYZER EMPLOYING SOLID STATE EMITTERS AND PHOTODETECTORS

BACKGROUND OF THE INVENTION

Nondispersive infrared gas analyzers, i.e., instruments that do not require an optically dispersive element such as a prism or grating spatially decomposing a radiation beam in accordance with the wavelength or wave number of its radiation components, are in very common use today, particularly for detecting and measuring pollutants in gases. These instruments are broadly classed into two main categories depending upon whether the instrument makes use of a selective detector stage or a selective emitter source. Subcategories then exist dependent on whether the instrument is a double-beam-in-space or a double-beam-in-time type device.

The most commonly used instrument is the double-beam-in-space, selective detector instrument utilizing a balanced condenser microphone detector, i.e., a gas-or-vapor-filled detector comprising two cavities separated by a movable diaphragm.

A very complete description of this latter type of analyzer as well as the many other forms of instruments is found in a text entitled "Non-Dispersive Infrared Gas Analysis in Science, Medicine and Industry" by D. W. Hill and T. Powell, published in 1968 by Plenum Press of New York, N.Y.

The typical form of nondispersive infrared gas analyzer is large in size, slow in operation, and subject to mechanical disturbances. The slowness and mechanical disturbances are mainly due to the fact that such instruments employ a mechanical means, such as a motor-driven rotating chopper disk, to modulate the infrared radiation from the source. Movement of the microphone diaphragm in the detector also contributes to these undesired characteristics.

One further problem with such analyzers is their high potential for spectral interference between the absorption spectra of the molecules whose concentration one desires to measure and the spectra of coexistent diluent or incidental gases and vapors. To alleviate this problem, great care has been necessary in the construction of highly selective forms of detectors, sources, filters, and their various combinations.

SUMMARY OF THE INVENTION

The present invention provides a nondispersive infrared gas analyzer or concentration meter which is completely without moving mechanical parts and which meets or exceeds the specifications relating to specificity, accuracy, sensitivity, speed, size, power, weight and ruggedness of existing instruments.

The instrument employs solid state emitters, e.g., injection diodes, as well as solid state photodetectors for the source and detector stages, with control circuits for minimizing the effect of operational conditions, principally changes due to environmental temperature and scattering from contaminants.

In its basic form, the instrument employs an optoelectronic network comprising two branches, each branch including a separate optical radiation beam, both beams passing through the sample. The spectrum of one beam is such that the detected radiation from that beam is substantially independent of the concentration of the absorbent to be measured, the detected radiation of the other beam thereby being differentially modulated relative to that of the first beam by the absorbent under analysis. This differential modulation is detected in the photoconductor stage of the instrument and develops an output indicative of the concentration of the absorbent. Means are provided in the optoelectronic network for controlling the relative radiation fluxes in the two branches of the network. Additional means are provided in the network for controlling the absolute amplitude of the fluxes in the two branches.

The two optoelectronic branches are modulated electronically, e.g., by means of multiplexing by time modulation or frequency modulation at suitable frequencies, thus producing a very fast device without the mechanical problems encountered with instruments employing mechanical modulation means such as rotating choppers or vibrating reeds.

In one embodiment of the invention, the source is made selective by employing a sample emitter having an emission spectrum enveloping the absorption spectrum of the gas or pollutant to be measured and a reference emitter having an emission spectrum omitting the absorption spectrum of the pollutant. In one form, the reference emitter is different from the sample emitter and has an emission spectrum close to but shifted from the emission spectrum of the sample emitter. In another form, the two emitters are the same and the reference emitter has the pollutant absorption spectrum removed therefrom before passage through the sample by first passing through a quantity of the same gas that is under study.

In another embodiment, the detector stage of the instrument is made selective by providing two photodetectors, one in each branch of the optoelectronic network, each detecting a particular one of the two radiation beams after passage through the sample, one photodetector serving as a reference photodetector, the beam impinging on the reference photodetector first passing through a quantity of the same gas that is under study.

DESCRIPTION OF THE PREFERRED EMBODIMENTS

Figure 1:
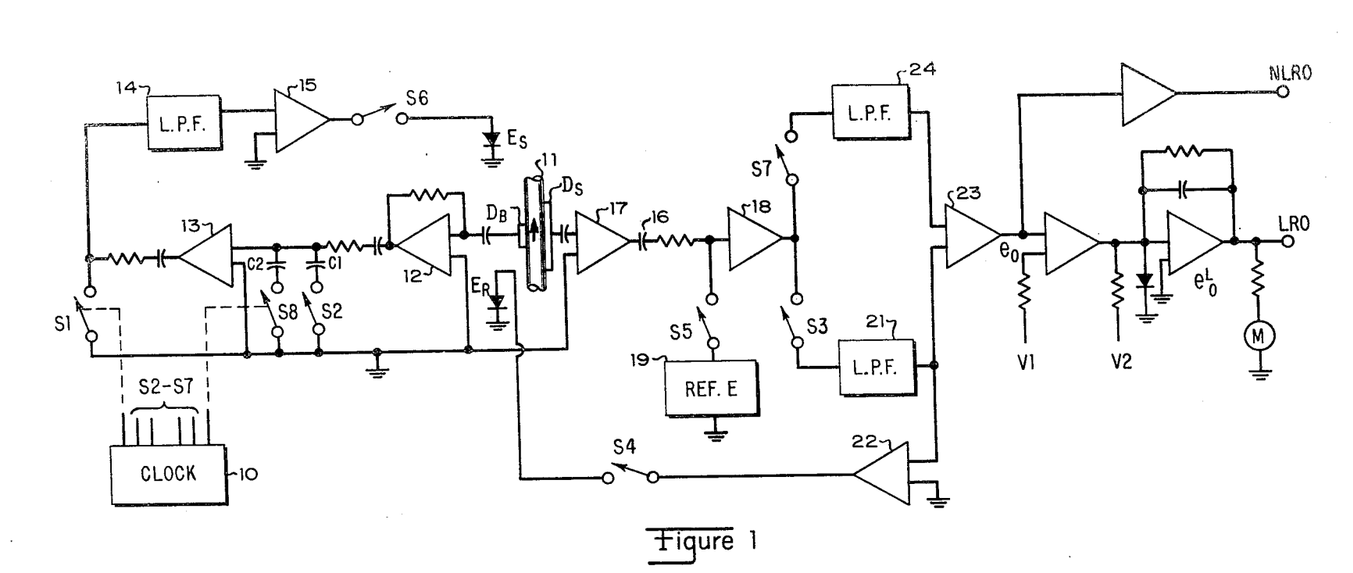
FIG. 1 is a schematic diagram of one from of nondispersive infrared gas analyzer employing the present invention and wherein a selective source employing different radiation emitters is utilized.
Figure 1A:
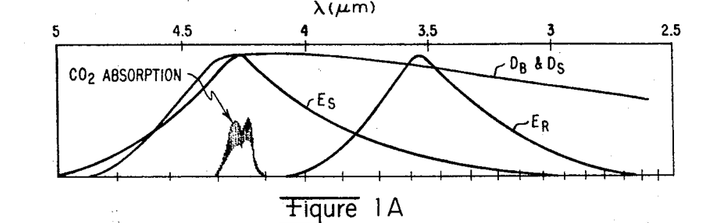
FIG. 1A shows traces of the emission spectra of typical sample and reference emitter diodes and the spectral response of a typical photoconductor employed in the system of FIG. 1.

Referring to FIG. 1 there is shown one preferred embodiment of the present invention wherein a pair of infrared radiation emitter diodes $E_S$ and $E_R$ are employed in the selective source stage of the system. The sample source $E_S$ chosen is one producing a radiation spectrum embracing a fundamental absorption spectrum of the selected gas to be analyzed. For example, in the case of a $CO_2$ gas analyzer, one of the fundamental absorption spectra of the $CO_2$ molecule centers about 4.3μm and the most desirable sample source $E_S$ is also one that centers about this frequency (see FIG. 1A). An infrared source of the type described in an article entitled "Electroluminescent Properties of $InAs_{1-x}Sb_x$ Alloys" by J. Y. Wong et al. appearing in the Extended Abstracts of the Los Angeles May 10–15, 1970, Meetings of the Electrochemical Society on pages 232-235 is very suitable. An $InAs_{.92}Sb_{.08}$ diode is centered on the absorption spectrum of $CO_2$ and has a half width covering the absorption band.

The reference diode $E_R$ chosen is one having an emission spectrum centered at 3.55μm, which is close to but removed from the emission spectrum of the sample diode, and preferably with little or no overlap of emission spectra; one suitable reference source is an InAs diode.

An injection diode is a preferred source $E_S$, $E_R$ for this system for essentially two reasons. Its emission half width for radiative recombinations near the absorption edge of the semiconductor material in which the recombination occurs is usually several kT wide. In the units of wave numbers, $\bar{\nu}$, expressed in $cm^{-1}$, 2kT at 300°K equals about 200 $cm^{-1}$. At lower temperatures, the half width is proportionately smaller; at higher temperatures larger. These half widths are of the same magnitude as the half width of the vibrational-rotational absorption spectra of gaseous molecules (see FIG. 1A). Unless the gas is at a temperature much higher than the infrared emitting diode, the emission spectrum of the diode embraces the absorption spectrum of the gas molecule.

The second desirable property of radiation emitting semiconductor diodes is the chemical control which can be exercised in choosing the center of their emission band. Each semiconductor compound has a characteristic emission band center whose spectral position is codetermined by the temperature and pressure under which the diode operates. This leads to a significant number of choices throughout visible and infrared spectra. More importantly, a large number of ternary and quaternary alloys can be formed between terminal compositions represented by semiconductor compounds. Thus, for instance, by synthesizing alloy compositions $InAs_{1-x}Sb_x$ between the terminal compositions InAs and InSb, the absorption edge may be positioned anywhere between 3 and 12μm in the infrared.

Figure 1B:
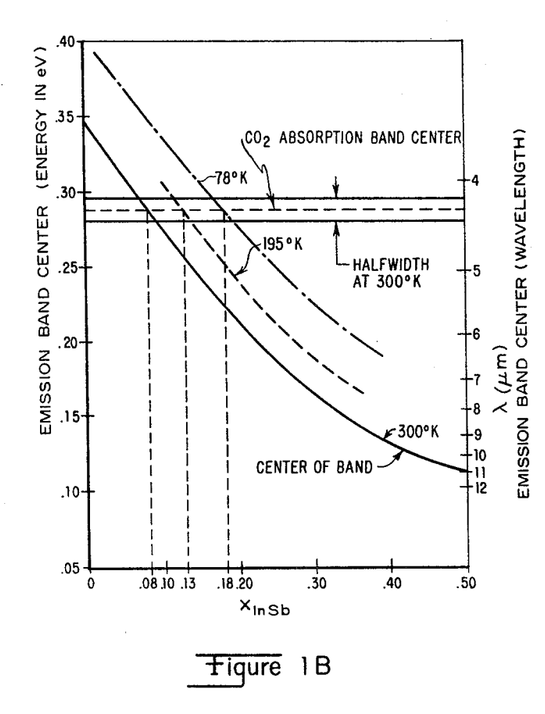
FIG. 1B illustrates the emission band center for the $InAs_{1-x}Sb_x$ system for three different operating temperatures.

As has been shown in the Wong et al. reference cited above, diodes with emission centered in the wavelength interval between 3.2 and 5.1μm have been fabricated. An alloy containing 8 percent InSb and 92 percent InAs produces a diode emission centered on the $CO_2$ absorption band when the diode is operated at 300°K, i.e., room temperature, as shown in the graph of FIG. 1B. For diodes operating at dry ice and liquid nitrogen temperatures, alloy compositions with 13 and 18 percent InSb, respectively, are selected.

Both of these diodes are positioned so that a portion of the radiation from each will impinge upon a balance detector $D_B$, for example a PbSe photoconductor, located in front of the sample to be analyzed, this sample being represented by the arrow in the light transparent conduit or chamber 11. Another portion of the light from each emitter diode passes through the sample gas and impinges on a sample detector $D_S$, e.g., a PbSe photoconductor, located on the far side of the conduit 11.

In selecting the PbSe photoconductors, it is important that they have nearly identical spectral responses throughout the region of the spectrum in which diodes $E_S$ and $E_R$ emit. However, it is most important that whatever these responses are, they track each other throughout the region of the spectrum under changing environmental and operating conditions. In choosing a proper photodetector attention has to be given to the special position of the absorption edge of the semiconductor material from which the detector is fabricated. This position determines the long wavelength cutoff of the photodetector and should be so chosen that the photodetector response embraces the emission spectra of both the emitter diodes $E_S$, $E_R$. Just as in the emitter case, the spectral position of the absorption edge is a function of temperature. In the case of PbSe, the temperature coefficient of the absorption edge position is of the opposite sign of that of the InAsSb alloys. This places an upper limit for the operating temperature of this particular embodiment described here at about 40°C.

Other detectors can be used, e.g., alloys of HgCdTe and also alloys of InAsSb, provided they meet the above conditions. Their composition should be selected to have an absorption edge at a longer wavelength than the absorption edge of the emitters. Also other photodetectors such as photovoltaic or photoelectromagnetic photodetectors can be used.

These semiconductor sources and detectors, while providing very selective systems, are sensitive to temperature and pressure, e.g., the amplitude, half width, and spectral position of such emitters are all temperature dependent. The systems disclosed herein all operate to compensate for such variables.

Figure 2:
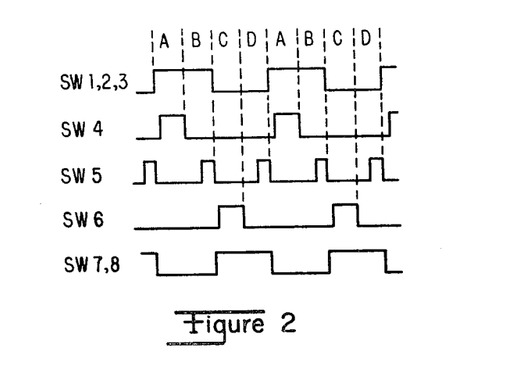
FIG. 2 is a chart illustrating the multiplexing of the system of FIG. 1.

In operation, a multiplexer or clock circuit 10 operates the switches S1 to S8 as shown in the chart of FIG. 2 in a repetitive manner with each cycle including four intervals. During most of interval A, the reference emitter diode $E_R$ is energized, followed by a dark interval B, C, and D; the sample emitter diode $E_S$ is energized in interval C and a dark interval follows in intervals D, A, and B. Although a slightly less than 25 percent duty cycle is shown for the emitters, this is only illustrative and a shorter or longer emitter "on" interval may be desirable.

During interval A, switches S1 through S4 are closed, and reference diode $E_R$ is energized, and its radiation activates the balance detector $D_B$ and the signal detector $D_S$. The output of the balance detector $D_B$ is amplified in amplifier 12 and stored in the capacitor C1, and this capacitor charges up to value determined by the detector $D_B$ output and thus by the intensity of the radiation of the emitter diode $E_R$.

During the following interval B, reference emitter diode $E_R$ is off, and the balance detector $D_B$ is looking at the dark level. Any detector output present during this dark interval also charges capacitor C1, so actually the charge on capacitor C1 is the average of the amplifier output during the "on" period of the reference emitter $E_R$ and the following dark period. This average charge on C1 is stored during the following two periods C and D when switch S2 is open.

During period C, switches S6, S7 and S8 are closed, switch S6 closing the circuit to energize the sample emitter diode $E_S$. The light impinging on the balance detector $D_B$ during this period produces an output proportional to the intensity thereof, and a charge indicative of this detector output is applied to capacitor C2. Since this capacitor C2 is also coupled to the balance detector $D_B$ during the following dark interval D, when switch S6 is open and the emitter diode $E_S$ is off, the actual charge on capacitor C2 is the average of the output of amplifier 12 during the "on" period of the sample emitter $E_S$ and the subsequent dark interval D.

Amplifier 13 amplifies the AC component of the input obtained from the two capacitors C1 and C2 at one half the clock frequency, due to the switching of the two switches S1 and S2; said AC component is present when the two capacitors do not have equal voltages stored thereon. If the voltage stored on each of the two capacitors is nearly equal, the input to amplifier 13 will have a small AC component to pass to the synchronous detector switch S1 which is closed during intervals A and B and open during intervals C and D.

The input to the low pass filter 14 will thus be a small DC component, the sign of which depends on which of the two capacitors C1 and C2 is high relative to the other and the amplitude of which depends upon the difference in voltage stored on the two capacitors. The output of the low pass filter 14 is transmitted to the DC amplifier 15 which supplies energizing current to the sample emitter diode $E_S$ during period C via switch S6. The voltage output of amplifier 15 controls the intensity of the light emitter from source $E_S$ and thus slaves sample emitter $E_S$ to the reference emitter $E_R$ to maintain a desired light intensity ratio between the two emitters.

In use, it may be desired that the ratio of the reference emitter light to the sample emitter light impinging on the signal detector $D_S$, when no selected gas is present in the conduit, be equal, and thus the ratio of the two light intensities impinging on the balance detector $D_B$ can be set so as to give this desired equal intensity at the sample detector $D_S$.

During interval A, with switches S3 and S4 closed and the reference emitter $E_R$ energized, the light therefrom passes through the sample conduit 11 and impinges on the sample light detector $D_S$. As noted above, the emission spectrum of this light is outside the absorption spectrum of the selected gas, and the same intensity impinges on the signal detector $D_S$ whether or not any amount of the gas to be analyzed is present in the conduit 11.

The output of the signal detector $D_S$, which is related to the light intensity impinging thereon, is amplified in amplifier 17 and then transmitted to an additional amplifier 18. During part of each of the dark intervals, switch S5 is closed and applies a reference voltage from source 19 to the input of amplifier 18 to set the amplifier to a selected reference input by means of charging capacitor 16. The output of amplifier 18 during interval A will be dependent on the difference between the reference voltage input of interval D and the input from amplifier 17 during intervals A and B. The output of amplifier 18 is transmitted via switch S3 and low pass filter 21 and appears as an error signal at the input to amplifier 22. The output of amplifier 22 is transmitted via switch S4 during interval A to maintain the light intensity of the reference emitter $E_R$ at the desired amplitude level. Thus, control is provided over the absolute amplitude of the flux from the radiation emitters $E_r$ and $E_s$. The output of the low pass filter 21 is also applied to one input of output amplifier 23 during intervals A and B. Actually, S5 is closed only during the latter part of interval B to maximize the light measurement from $D_S$ during the decay time of $D_S$ after $E_R$ turns off.

During interval C, the sample emitter $E_S$ is energized, the light passing through the sample conduit 11 and onto sample detector $D_S$. The detected light intensity will be a function of the abundance or concentration of the selected gas in the gas sample. Any light intensity differences will appear as a difference in the amplitude input at amplifier 18 from the reference input from source 19 applied during the dark interval. The output of amplifier 18 is transmitted via switch S7 and the low pass filter 24 to the other input of the output amplifier 23. The output $e_o$ of amplifier 23 is related to the difference between the two inputs during the intervals A and C and is thus measurably related to the amount of light absorption by the selected gas in conduit 11 from the sample light emitter $E_S$. This output $e_o$ is transmitted to a recorder, meter, or the like as a measure of the concentration of the selected gas present in the conduit. The output $e_o$ is non-linear, with a decreasing rate of change of amplitude with increasing $CO_2$ concentration, and a non-linear read-out (NLRO) is provided. In addition, a linearizer circuit coupled to output amplifier 23 may be provided to produce a linear read-out (LRO).

Figure 3:
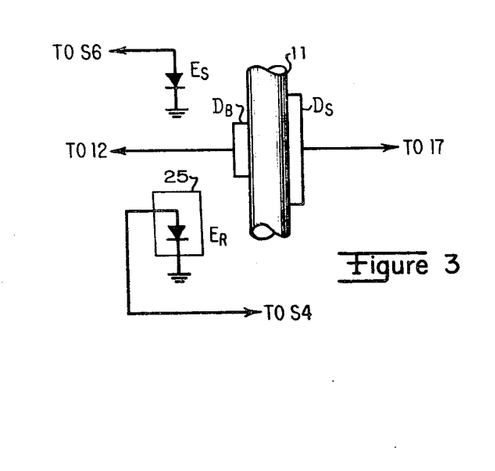
FIG. 3 is a schematic diagram of a different form of selective source that may be used in the system of FIG. 1.
Figure 3A:
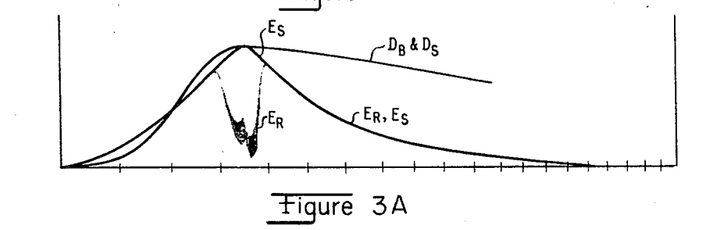
FIG. 3A shows the emission spectra of the two emitter diodes used in the system of FIG. 3 as well as the spectral response for the photoconductor.

Another embodiment of the present invention shown in FIG. 3 incorporates an emission source which is more selective than the source of FIG. 1, the latter source employing two different type emitter diodes. In FIG. 3 the two emitters $E_S$ and $E_R$ are the same, for example $InAs_{.92}Sb_{.08}$, and the reference diode $E_R$ is enclosed in a transparent cell 25 containing the selected gas, i.e., $CO_2$ in this example. The light passing from the cell 25 has the $CO_2$ absorption spectrum removed from its emission spectrum, and thus, as with the InAs diode of FIG. 1, no significant absorption of this light takes place as it passes through the $CO_2$ in the sample conduit 11. The emission spectra of $E_S$ and $E_R$ are shown superimposed on each other in FIG. 3A, with the $CO_2$ absorption from the $E_R$ spectrum.

Figure 4:
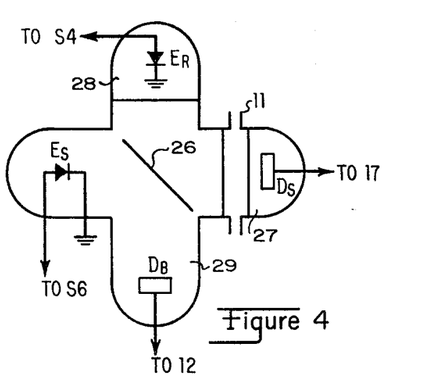
FIG. 4 is a schematic diagram of one possible form for the source and detector apparatus of FIG. 1.

A preferred form of emitter diode source and diode detector system is shown in FIG. 4 wherein all four optoelectronic devices $E_S$, $E_R$, $D_B$, and $D_S$ are positioned mutually normal with a beam splitter 26 at the center.

The light from the sample infrared emitter diode $E_S$ is directed onto the beam splitter, a portion of this light being reflected onto the balance detector $D_B$ and the remainder passing through the beam splitter and the sample conduit or chamber 27 and onto the signal detector $D_S$.

The reference emitter diode $E_R$ is located in a chamber 28 filled with absorbing gas, in this example $CO_2$, so that the emitted light has the $CO_2$ absorption spectrum removed. A portion of this light passes through the beam splitter 26 to the balance detector $D_B$ and the remainder is reflected through the gas sample chamber 27 and onto the signal detector $D_S$.

Where it is expected that a gas with an absorption spectrum near to or overlapping the absorption spectrum of the gas under analysis, for example $N_2$ in a $CO_2$ analyzer, may be present in the sample chamber 27 and may affect the concentration reading, this interfering gas may also be added into the main chamber 29. The light from both emitters $E_R$ and $E_S$ will have the absorption spectrum of this interfering gas removed before passage through the sample chamber 27 so that changes in light intensity detected by detector $D_S$ will be due to the selected gas under study.

Figure 5:
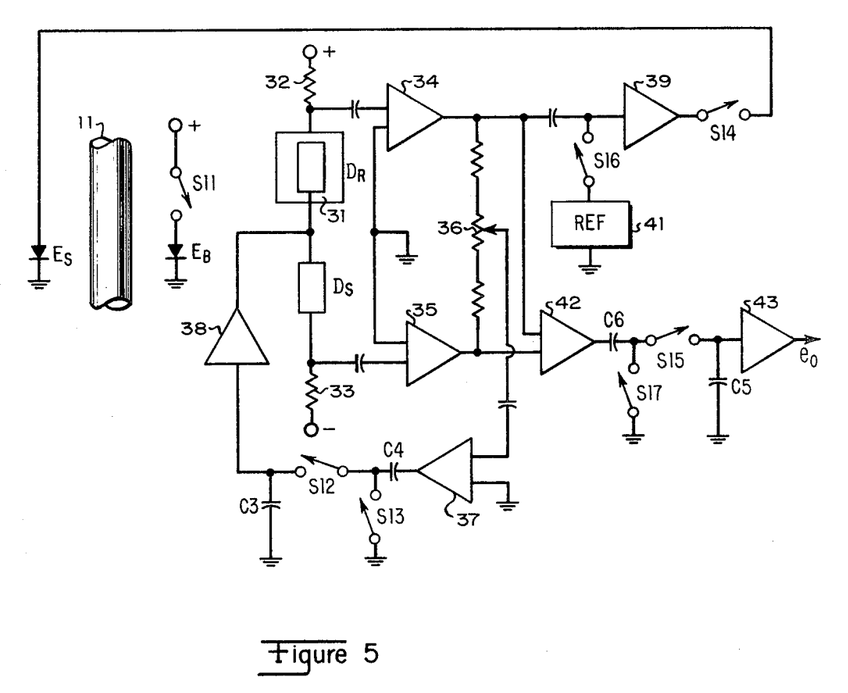
FIG. 5 is a schematic diagram of another form of nondispersive infrared gas analyzer utilizing a selective photodetector stage.

Referring now to FIG. 5, there is shown an embodiment of the invention wherein the light detector stage of the system is made selective rather than the light source stage as in the above described embodiments.

Figure 5A:
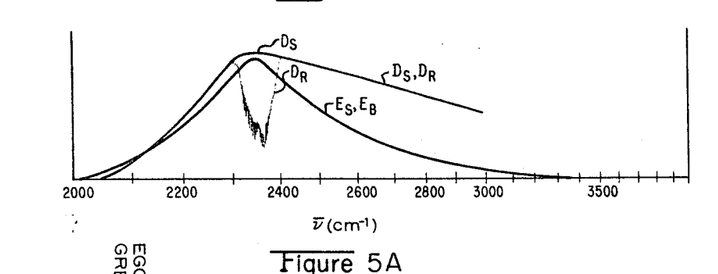
FIG. 5A illustrates the emission spectra of the two emitter diodes and the spectral response for the two detectors employed in the system of FIG. 5.
Figure 6:
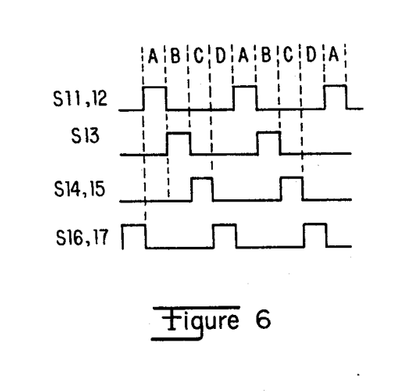
FIG. 6 is a chart illustrating the multiplexing of the system of FIG. 5.

A suitable infrared radiation emitter balance diode $E_B$ is energized during interval A by the closure of switch S11 (see FIG. 6); the intensity of the light emitted is settable to a desired level by controlling the current to the diode. The radiation impinges on a reference detector $D_R$ after first passing through a quantity of the selected gas 31, e.g., $CO_2$, so that the main or fundamental absorption spectrum of the selected gas is removed before impinging on detector $D_R$. The radiation also impinges on a sample detector diode $D_S$ without filtering. The emission spectra of $E_S$ and $E_B$ and the spectral responses of $D_S$ and $D_R$ are shown in FIG. 5A, with the $CO_2$ absorption void in the $D_R$ response.

The two detectors $D_R$ and $D_S$ are connected in series across a biasing circuit including resistors 32 and 33 coupled to positive and negative sources, respectively. A control circuit is utilized to maintain the outputs from the two detectors balanced in a desired selectable ratio, for example, equal amplitudes, during the reference interval A. This control circuit includes a pair of amplifiers 34 and 35 with one input of each amplifier coupled to an associated one of the detectors. The outputs of the two amplifiers are coupled together via a resistance circuit including the resistance of potentiometer 36, the sliding contact of the potentiometer being coupled to one input of the feedback amplifier 37. Potentiometer 36 is used initially to adjust the balance of the bridge comprising $D_R$, $D_S$, amplifiers 34 and 35, and the resistance circuit. The output of the amplifier 37 is coupled to a synchronous detector circuit including capacitors C3 and C4 and switches S12 and S13. The output of the synchronous detector is coupled via amplifier 38 to the junction point of the two detectors $D_R$ and $D_S$ to form a balance loop circuit to the two light detectors.

The output of amplifier 34 is also coupled to an amplifier 39, the input of which is connected to a reference voltage source 41 via switch S16 during each dark interval D preceding the balance source $E_B$ on interval A. The output of amplifier 39 is coupled via switch S14 to a sample emitter diode $E_S$ which, when energized during interval C, transmits light through the sample gas in light transparent conduit or chamber 11 and onto the two detectors $D_R$ and $D_S$, thus providing a light intensity control loop for the sample emitter.

The output of amplifier 34 is also coupled to one input of differential amplifier 42, the other input of amplifier 42 being coupled to the output of amplifier 35. The output of amplifier 42 is coupled via a synchronous detector circuit comprising capacitors C5 and C6 and switches S15 and S17 to the output amplifier 43 which delivers the output $e_o$ representing the abundance of the selected gas in the sample gas.

In operation, during interval A (FIG. 6) the balance emitter $E_B$ is energized with switches S11 and S12 closed, and the light emitted therefrom impinges on both $D_S$ and $D_R$. The output from amplifier 34 is proportional to the output of detector $D_R$ and the output of amplifier 35 is proportional to the output of detector $D_S$. Any input appearing at amplifier 37 due to an imbalance in the outputs of amplifiers 34 and 35 will result in an output voltage which is stored on capacitor C3.

During the following dark interval B with switch S13 closed, any imbalance between the outputs of amplifiers 34 and 35 due to a difference in the outputs of the detectors $D_R$ and $D_S$ will result in a voltage output from amplifier 37 stored on capacitor C4.

The synchronous detector circuit formed by capacitors C3 and C4 and switches S12 and S13 produces a DC voltage output at the junction of the two detectors $D_R$ and $D_S$, the sign of which depends on the direction of the output imbalance between amplifiers 34 and 35 and the amplitude of which depends on the extent of the imbalance. A negative output from amplifier 38 increases the bias across detector $D_R$ and decreases the bias across detector $D_S$, while a positive output will produce the opposite change in biasing. This feedback control will operate to maintain the outputs of amplifiers 34 and 35 equal during the balancing period comprising intervals A and B.

During interval C, the output of the amplifier 39 is coupled via switch S14 to the sample emitter diode $E_S$. The light from this energized diode passes through the gas sample conduit 11 and impinges on the two detectors $D_R$ and $D_S$.

The output of detector $D_R$, which is independent of the abundance of the selected gas in conduit 11 since the absorption spectrum is removed by the selected gas 31 surrounding the detector $D_R$ in any case, is transmitted to the input of amplifier 39 where it is compared with the reference voltage from source 41 applied via switch S16 during the dark interval D. The output of amplifier 39 is responsive to the difference in the two voltage inputs and is utilized to control the intensity output of emitter $E_S$ to maintain the voltage inputs to amplifier 39 nearly equal.

The output of amplifier 34 is also coupled to one input of amplifier 42, the other input being coupled to the output of amplifier 35. During interval C, the "on" time of sample emitter $E_S$, the output of amplifier 42, which is proportional to the difference in outputs from the two detectors $D_R$ and $D_S$, charges up capacitor C5 via switch S15. During the following dark interval D, the output voltage of amplifier 42 is stored on capacitor C6 with switch S15 open and switch S17 closed. This synchronous detector circuit produces a DC output voltage proportional to the difference between the two voltage inputs from amplifiers 34 and 35, the DC output of amplifier 43 thus serving as a measure of change in light intensity impinging on light detector $D_S$ due to absorption by the selected gas in the sample conduit 11.

Figure 7:
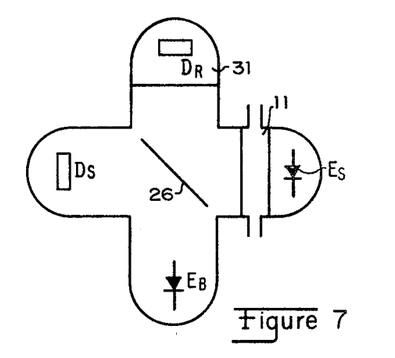
FIG. 7 is one form of structure for the source and detector apparatus of FIG. 5.

The emitters and detectors of the system of FIG. 5 may be incorporated in a structure similar to that of FIG. 4 as shown in FIG. 7.

From the above descriptions of the systems of FIGS. 1, 3, 4, 5 and 7 it can be seen that the novel optoelectronic network utilized in this optical radiation analyzer employs two optical branches, with means for producing a pair of optical radiation beams passing through the sample, one beam in each branch, the spectrum of one beam being such that the detected radiation from that beam is substantially independent of the concentration of the absorbent, the detected radiation of the other beam thereby being differentially modulated by the absorbent in the sample. Means is provided for detecting the modulation of the radiation in each of the branches by the sample absorbent, and an additional means is provided for controlling the relative radiation fluxes in the two branches.

In the case of FIGS. 1, 3, and 4, one optical branch comprises the emitter $E_S$ producing the beam passing through the sample in container 11 and the other optical branch comprises the emitter $E_R$ in FIG. 1 or emitter $E_R$ and the enveloping gas cell in FIGS. 3 and 4 producing the beam passing through the sample. Both of these beams impinge on the detector $D_S$ which is provided with associated circuitry for detecting the modulation of each of the two beams due to the sample absorbent. The detector $D_B$ and associated circuitry provide control of the relative radiation fluxes, i.e., the beam intensity, in the two branches.

In the case of FIGS. 5 and 7 the two beams in the two branches are both provided by the source $E_S$, the beam impinging on detector $D_S$ being differentially modulated by the sample in container 11 relative to the beam impinging on detector $D_R$ due to the fact that the detector $D_R$ is enveloped by a quantity of the gas under analysis and is thus rendered insensitive to changes in the beam due to sample modulation. Thus the selective detector structure including $D_S$ and $D_R$ detects the modulation of one beam relative to the modulation of the other beam. The light beams from source $E_B$ impinging on the detectors $D_S$ and $D_R$ serve to control the relative radiation fluxes, i.e., the currents in the detectors, in the two branches.

Figure 8:
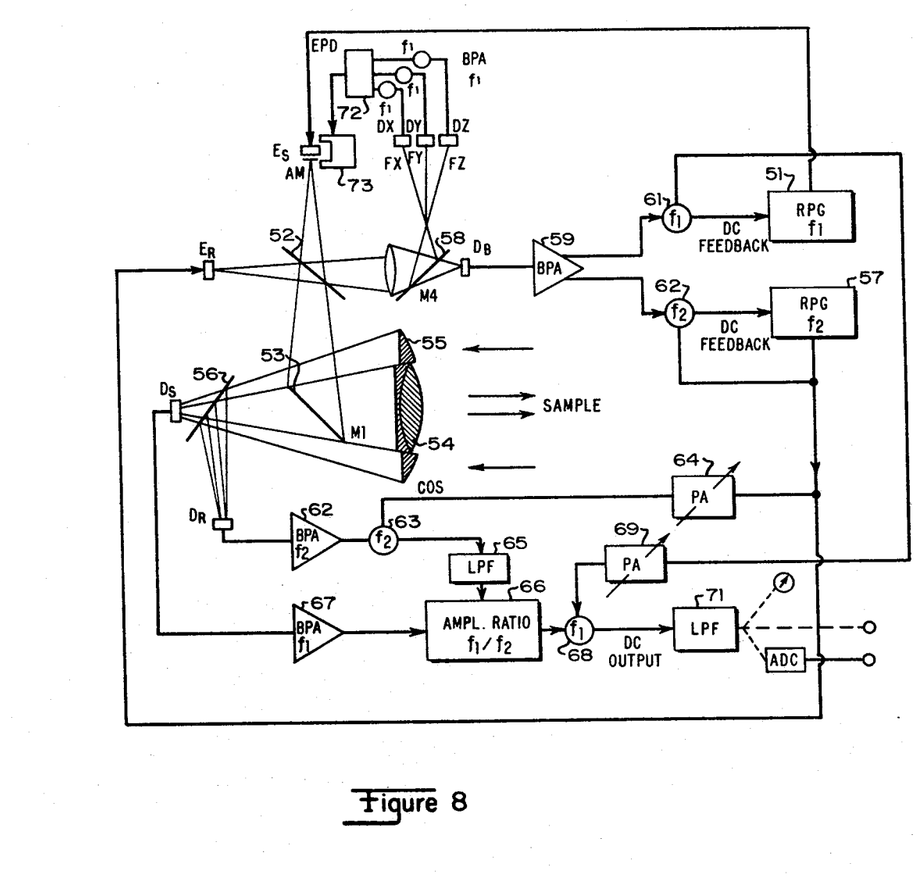
FIG. 8 is a schematic diagram of still another embodiment of the present invention shown in use in analyzing pollutants over relatively long distances.

Referring to FIG. 8 there is shown an infrared detector which employs the present invention and which is suitable for measuring gas absorption over relatively long distances.

The infrared sample source or emitter diode $E_S$, which has an emission spectrum embracing that of the absorption spectrum of the gas to be measured, is amplitude modulated at a carrier frequency $f_1$ by the regulated power generator 51. A portion of the radiation from source $E_S$ is transmitted through a beam splitter 52 and reflected by mirror 53 through the central portion 54 of a concentric optical system to the gas medium to be sampled. Depending on the nature of the pollutant, and its desired detection limit, this medium may be an open-path system up to thousands of feet long or it could be a local or point system whose optical path length is dozens to hundreds of feet. The beam is directed to a single retro-reflector (not shown) or to a system of such reflectors, if beam folding is desired.

The reflected radiation beam is gathered by the outer portion 55 of the concentric optical system and focused onto the photodetector $D_S$ through a beam splitter 56.

An infrared emitter $E_R$ having an emission spectrum close to that of emitter $E_S$ but not embracing the absorption spectrum of the gas to be sampled is amplitude modulated at a carrier frequency $f_2$ by the regulated power generator 57. A portion of the radiation from source $E_R$ is reflected from the beam splitter 52 and the mirror 53 and passes centrally out through optics 54 and into the sample medium. This radiation will also be reflected back to impinge on detector $D_S$.

A portion of the radiation from source $E_S$ is reflected from the beam splitter 52 and a portion of the radiation from source $E_R$ is transmitted through the beam splitter 52, these two radiations passing through the beam splitter 58 and impinging on a suitable photodetector $D_B$. The output of balance detector $D_B$ is amplified in the band pass amplifier 59 and the output is separated into its frequency components $f_1$ and $f_2$ by the two synchronous detectors 61 and 62. The DC error signal from synchronous detector 61, which is related to the intensity of the light transmission from emitter $E_S$, is employed to control the level of the output of generator 51 used to energize $E_S$. In a similar manner, the DC error signal output of synchronous detector 62 controls the output level of generator 57 to emitter $E_R$. In this manner the desired ratio of light intensity of the two emitters $E_S$ and $E_R$ may be automatically maintained.

A portion of the returning radiation containing both $f_1$ and $f_2$ components is reflected by beam splitter 56 onto photodetector $D_R$ and another portion is transmitted through the beam splitter 56 onto the photodetector $D_S$. The reference or $f_2$ component of the incoming radiation, which has been modulated by all the background absorbents in the sample, as distinguished from the fundamental absorbent under study, is transmitted via detector $D_R$ and the $f_2$ band pass filter 62 to the synchronous detector 63. A reference $f_2$ signal is also transmitted to synchronous detector 63 from the main $f_2$ generator 57 after suitable phase adjustment in the phase shift circuit 64. The output of the synchronous detector 63 is transmitted via the low pass filter circuit 65 to an amplitude ratio comparator circuit 66.

The $f_1$ modulated light detected by light detector $D_S$ is transmitted via the $f_1$ band pass amplifier 67 to the amplitude ratio circuit where an amplitude ratio of the pollutant gas against the optical background level is derived. The output of this ratio circuit is transmitted to a synchronous detector circuit 68 which receives a reference signal via phase adjuster circuit 69 from the $f_1$ generator 51. The DC output representing the concentration of the pollutant gas is bandwidth limited in low pass filter 71 for either analog or digital presentation.

A portion of the light from the diodes $E_R$ and $E_S$ is reflected from beam splitter 58 onto a detector system comprising the three photon detectors $D_x$, $D_y$ and $D_z$ and associated narrow optical band pass filters $F_x$, $F_y$ and $F_z$.

Detector system $F_y$, $D_y$ is designed to detect the light at the center band of the emission spectrum of diode $E_S$ while detector systems $F_x$, $D_x$ and $F_z$, $D_z$ detect the light in bands in the spectrum of $E_S$ on either side of the center band of the $E_S$ spectrum, respectively. The outputs from the three detectors $D_x$, $D_y$ and $D_z$ are compared in a comparator circuit 72, and the output used to control a regulated environment modulator 73 operative to control the electro-acoustic (pressure) or thermal environment of the diode $E_S$, and thus maintain it tuned to the center band of the absorbent gas or pollutant under investigation.

We claim:

1. A nondispersive optical radiation analyzer for measuring the concentration of a specific absorbent in a sample, said analyzer comprising:
    source means for providing a first optical radiation beam and a second optical radiation beam, both beams passing through the sample;
    detection means for independently detecting radiation of the two beams after they have passed through the sample, the detected radiation of the first beam being substantially independent of the concentration of the specific absorbent in the sample and the detected radiation of the second beam being modified by the specific absorbent in the sample, the detection means providing an electrical output signal indicative of the first beam and an electrical output signal indicative of the modified second beam;
    first optoelectronic control means for controlling the level of the electrical output signal indicative of the second beam relative to the level of the electrical output signal indicative of the first beam;
    electronic modulating means for electronically modulating the beams provided by the source means; and
    electronic output means for electronically demodulating the electrical output signals from the detection means and for providing an output indication of the modified second beam relative to the first beam to obtain a measure of the concentration of the specific absorbent in the sample.

2. An analyzer as in claim 1 including second optoelectronic control means for controlling the absolute amplitude of the fluxes in the two beams.

3. An analyzer as in claim 1 wherein said electronic modulating means comprises a time multiplexing circuit.

4. An analyzer as in claim 1 wherein said electronic modulating means comprises a frequency multiplexing circuit.

5. An analyzer as in claim 1 wherein:
    said source means comprises a pair of solid state radiation emitters;
    said detection means comprises a solid state radiation detector positioned to intercept the two beams after passage through the sample; and
    said first optoelectronic control means comprises another solid state radiation detector positioned to sample the radiation of the two beams before passage through the sample.

6. An analyzer as in claim 5 including second optoelectronic control means for controlling the absolute amplitude of the fluxes in the two beams.

7. An analyzer as in claim 5 wherein said electronic modulating means comprises a time multiplexing circuit.

8. An analyzer as in claim 5 wherein said electronic modulating means comprises a frequency multiplexing circuit.

9. An analyzer as in claim 6 wherein a quantity of the specific absorbent is positioned so that the first beam passes therethrough, the spectrum of the first beam being selectively absorbed thereby before passing through the sample.

10. An analyzer as in claim 9 including second optoelectronic control means for controlling the absolute amplitude of the fluxes in the two beams.

11. An analyzer as in claim 10 wherein said electronic modulating means comprises a time multiplexing circuit.

12. An analyzer as in claim 1 wherein:
    said source means comprises a first solid state emitter;
    said detection means comprises a first solid state radiation detector positioned to intercept the first beam and a second solid state radiation detector positioned to intercept the second beam; and
    said first optoelectronic control means comprises a second solid state radiation emitter positioned to direct radiation onto the first and second solid state radiation detectors without passing through the sample.

13. An analyzer as in claim 12 wherein a quantity of the specific absorbent is positioned so that after passing through the sample the first beam then passes through this quantity of the specific absorbent before impinging on the first solid state radiation detector.

14. An analyzer as in claim 12 including second optoelectronic control means for controlling the absolute amplitude of the fluxes in the two beams.

15. An analyzer as in claim 14 wherein said electronic modulating means comprises a time multiplexing circuit.

16. An analyzer as in claim 15 wherein said first and second solid state radiation detectors have spectral responses that track each other with changes in ambient conditions.

* * * * *